(12) United States Patent
Anguiano

(10) Patent No.: US 8,745,651 B2
(45) Date of Patent: Jun. 3, 2014

(54) SYSTEMS AND METHODS FOR AUDITING AUTHORIZATION OF A SERVICE USING DISPLAYED WATERMARKS

(75) Inventor: Jason Anguiano, Castle Rock, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 504 days.

(21) Appl. No.: 12/486,681

(22) Filed: Jun. 17, 2009

(65) Prior Publication Data

US 2010/0325649 A1  Dec. 23, 2010

(51) Int. Cl.
*H04H 60/32* (2008.01)
*H04N 7/167* (2011.01)

(52) U.S. Cl.
USPC .............. 725/19; 725/31; 725/131; 725/134; 725/139; 725/151; 386/260; 713/176

(58) Field of Classification Search
CPC .......... H04N 21/8358; H04N 21/4623; H04N 21/4405; H04N 7/26372
USPC ........... 725/1, 19, 25, 31, 131, 134, 139, 151; 386/260; 382/100; 713/176; 705/14.26, 705/14.47
See application file for complete search history.

(56) References Cited

U.S. PATENT DOCUMENTS

| | | | | |
|---|---|---|---|---|
| 6,040,829 A | * | 3/2000 | Croy et al. | 715/864 |
| 6,067,440 A | * | 5/2000 | Diefes | 725/27 |
| 6,625,295 B1 | * | 9/2003 | Wolfgang et al. | 382/100 |
| 6,700,989 B1 | * | 3/2004 | Itoh et al. | 382/100 |
| 7,418,599 B2 | * | 8/2008 | Peters | 713/193 |
| 7,639,833 B2 | * | 12/2009 | LeComte et al. | 382/100 |
| 7,778,420 B2 | * | 8/2010 | Kocher et al. | 380/210 |
| 7,987,369 B2 | * | 7/2011 | Zhang et al. | 713/176 |
| 2002/0078441 A1 | * | 6/2002 | Drake et al. | 725/9 |
| 2005/0135656 A1 | * | 6/2005 | Alattar et al. | 382/100 |
| 2006/0200673 A1 | * | 9/2006 | Zhang et al. | 713/176 |
| 2009/0141931 A1 | * | 6/2009 | Yadid-Pecht et al. | 382/100 |
| 2010/0064305 A1 | * | 3/2010 | Schumann et al. | 725/19 |

FOREIGN PATENT DOCUMENTS

| | | |
|---|---|---|
| FR | 2849563 A1 | 7/2004 |
| JP | 2008244634 A | 10/2008 |
| KR | 100799090 B1 | 1/2003 |
| WO | 0161508 A1 | 8/2001 |

* cited by examiner

*Primary Examiner* — Pinkal R Chokshi
(74) *Attorney, Agent, or Firm* — Lowe Graham Jones PLLC

(57) ABSTRACT

Auditing systems and methods detect access authorization of a media device for a service during an audit. An exemplary embodiment receives an audit trigger at a media device communicating the service to a media presentation device, determines whether the media device is authorized to communicate the service to the media presentation device, and communicates a security watermark from the media device to the media presentation device. The security watermark is displayed on a display of the media presentation device and indicates authorization to access the service to an auditor performing the audit.

21 Claims, 1 Drawing Sheet

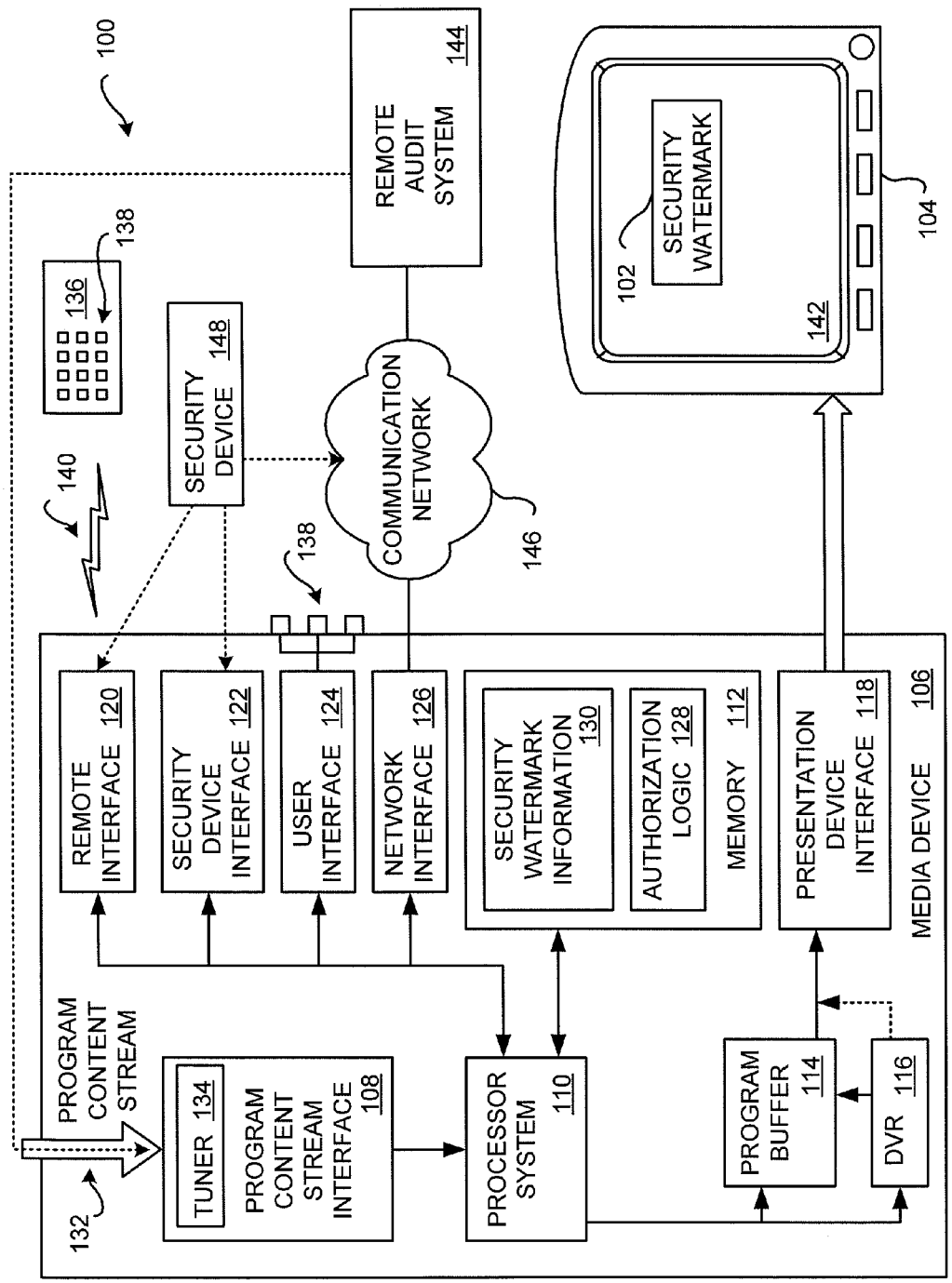

SYSTEMS AND METHODS FOR AUDITING AUTHORIZATION OF A SERVICE USING DISPLAYED WATERMARKS

BACKGROUND

Some businesses have televisions (TVs) or other display devices available at their business premises for customer viewing. For example, a sports bar will have many TVs located about the bar so that their customers are able to view their favorite sporting events. Many businesses obtain their programming from a program provider, such as a cable network, an Internet service provider, or satellite system provider, since such programming providers are able to provide a wide range of programming services that are not available over the local public systems.

For example, a sports bar in Denver may be able to receive, via local wireless signals, a broadcast of a local sporting event provided by a local television station. However, it is unlikely that the sports bar will be able to provide a sporting event in another city unless they are receiving programming from a cable network or satellite system provider.

Various premium services are available from the program providers. As used herein, a premium fee service is any service in which fees are charged. For example, a premium service may include a fee-based service paid monthly or on a per-use basis, or may be additional services which may include premium program channels, and/or premium service events or programs. For example, a premium service package sold to the sports bar in Denver may include one or more premium service sports channels that provide coverage of sporting events in many different cities. Accordingly, the sports bar may tune one or more of its TVs to those particular sporting events that are of interest to its customers.

Generally, business operators are honest individuals who responsibly pay for services that are provided by their cable network or satellite system provider. However, unscrupulous business operators may, on occasion, pirate or otherwise illegally access premium service programming that they have not contracted and/or paid for. As an example, a residential account set top box (STB) may be authorized to receive a particular premium service channel. Generally, residential account rates are less than commercial account rates. Thus, the unscrupulous business operator may take a residential account STB to their place of business, and use the authorized residential account STB to show programs available on the premium service channel to their customers.

Account packing is another example of an unauthorized access to a premium service. For example, a hotel operator may contract with the program provider for an authorized residential account STB for use at their home. However, an unscrupulous hotel operator may take this residential account STB to the hotel and hook up many STBs at the hotel. The unauthorized STBs would be operable since the unauthorized STBs are receiving the authorized residential account signal.

Many systems have been devised to detect theft of unauthorized premium services. On-site audits can be a very effective tool in discouraging the potentially unscrupulous business operator. However, the program provider typically prefers to maintain a positive, open business relationship with its customers, and on site audits may be undesirable from a public relations viewpoint. Further, the clever unscrupulous business operator can take measures to defeat an onsite inspection to detect the theft of unauthorized premium services. For example, an unauthorized residential account STB could be hidden away in the business premises such that the on-site auditor could not visibly detect the use of the residential account STB.

Accordingly, it is desirable to provide for a way to detect the illegal theft of unauthorized services by an unscrupulous business operator in an unobtrusive manner, and/or without notice so that the unscrupulous business operator does not have time to reconfigure their system to avoid detection of the theft of the unauthorized services.

SUMMARY

Auditing systems and methods that detect access authorization of a media device for a service during an audit are disclosed. An exemplary embodiment receives an audit trigger at a media device communicating the service to a media presentation device, determines whether the media device is authorized to communicate the service to the media presentation device, and communicates a security watermark from the media device to the media presentation device. The security watermark is displayed on a display of the media presentation device and indicates authorization to access the service to an auditor performing the audit.

BRIEF DESCRIPTION OF THE DRAWINGS

Preferred and alternative embodiments are described in detail below with reference to the following drawing:

FIG. 1 is a block diagram of an embodiment of the service authorization system.

DETAILED DESCRIPTION

FIG. 1 is a block diagram of an embodiment of the service authorization system 100. An exemplary embodiment of the service authorization system 100 generates a watermark 102 that is viewable by a service representative (auditor) conducting an on-site audit of a business premises where a media presentation device 104, coupled to a media device 106, is providing a service supplied by a program provider. The watermark is generated during the audit in response to a trigger that is generated during the audit. The presence (or absence) of the viewable watermark indicates to the auditor that a particular service is authorized. For example, the viewable watermark would indicate that the programming is authorized to be presented on the media presentation device 104.

As used herein, a watermark is defined as a viewable artifact that is displayed on the media presentation device 104 to indicate authorization. One example of a watermark is an image, a logo, and/or textual message that is presented over the displayed image. In some auditing scenarios, the watermark has some degree of transparency to provide for uninterrupted or continued viewing of the displayed image. Such watermarks may be relatively large so as to be readily visible to the auditor from a distance. Alternatively, watermarks may be relatively small so as to not be readily perceptible to a casual viewer. Some watermarks may be opaque, and thus be readily discernable when displayed over the presented image. Such watermarks may be configured to interrupt viewing of the presented program. For example, the watermark may fill a large portion of the screen, or even the entire screen. Other watermarks may appear as a pop-up pane or the like.

An exemplary embodiment of the media device 106 includes, but is not limited to, a set top box (STB). The exemplary media presentation device 104 is a television (TV) or the like. Embodiments of the service authorization system 100 may be implemented in other media devices 106, such as, but not limited to, digital video disc (DVD) players, portable media players, digital video recorders (DVRs), personal device assistants (PDAs), or personal computers (PCs).

The non-limiting exemplary media device 106 comprises a program content stream interface 108, a processor system 110, a memory 112, a program buffer 114, an optional digital video recorder (DVR) 116, a presentation device interface 118, an optional remote interface 120, an optional security device interface 122, an optional user interface 124, and an optional network interface 126. The memory 112 comprises a portion for storing the authorization logic 128 and an optional portion for storing security watermark information 130.

Other media device embodiments may include some, or may omit some, of the above-described media processing components. Further, additional components not described herein may be included in alternative embodiments.

The functionality of the media device 106, here an exemplary STB, is now broadly described. One or more program content streams 132 in a transport channel are received by the program content stream interface 108. One or more tuners 134 in the program content stream interface 108 selectively tune to one of the program content streams 132 in accordance with instructions received from the processor system 110. A program content stream 132 typically comprises a plurality of programs and/or other information multiplexed together. In this example, the service may be a premium service that is one of the programs included in the program content stream 132.

The processor system 110, based upon a request for a program of interest specified by a viewer, parses out program content associated with the program of interest. For example, a program of interest associated with the premium service may be parsed out of the program content stream 132. The premium service program of interest is then assembled into a stream of video and/or audio information which may be saved into the program buffer 114 such that the program content can be streamed out to the media presentation device 104, such as the exemplary television, via the presentation device interface 118. Alternatively, or additionally, the parsed out program content may be saved into the DVR 116 for later presentation.

Other information in the transport channel is also parsed out from the received transport channel. An example of such information is the electronic program guide (EPG) information that is in a separate data stream of the transport channel. Another example of other information that may be communicated to the media device 106 in a data stream are device specific messages and/or commands. The identifier of the media device is used to address specific messages and/or commands to that particular media device 106.

The exemplary media device 106 is configured to receive instructions from a viewer via a suitable control device, such as, but not limited to, the exemplary remote control 136. The remote control 136 includes one or more actuators 138. Actuators 138 may be buttons, switches, a multi-position sensing device configured to sense a plurality of switch positions, a touch sensitive device, or the like, which are operable by a viewer. The viewer, by actuating one or more of the actuators 138, causes the remote control 136 to generate and transmit instructions, via a wireless signal 140, to the media device 106 to control the media device 106 and/or the media presentation device 104. Alternatively, or additionally, the media device 106 may itself have one or more actuators 138 coupled to the user interface 124 that are configured to receive instructions from the viewer. Thus, the viewer may input instructions manually to the media device 106.

A selected program of interest, typically selected by the viewer using commands from the remote control 136, are streamed out from the program buffer 114 or the DVR 116 to the presentation device interface 118. The presentation device interface 118 is communicatively coupled to the media presentation device 104 having a display 142. Accordingly, the selected program of interest is communicated from the presentation device interface 118 to the presentation device 104. The video portion of the selected program is presented on the display 142 and an audio portion is provided or speakers (not shown). A non-limiting example of the presentation device 104 is a television.

Some embodiments of the media device 106 include the optional network interface 126. The network interface 126 is configured to couple the media device 106 with the remote audit system 144 and/or the security device 148, via a communication network 146. The communication network 146 is illustrated as a generic communication system. In one embodiment, the communication network 146 comprises the Internet. Accordingly, the network interface 126 is a modem or other type of Internet communication device. Alternatively, the communication network 146 may be a telephony system, a radio frequency (RF) wireless system, a microwave communication system, a fiber optics system, an intranet system, a local access network (LAN) system, an Ethernet system, a cable system, a radio frequency system, a cellular system, an infrared system, a satellite system, or a hybrid system comprised of multiple types of communication media. In such embodiments, the network interface 126 is configured to establish a communication link or the like with the communication network 146 on an as-needed basis, and is configured to communicate over the particular type of communication network 146 that it is coupled to.

Some embodiments of the media device 106 include the optional security device interface 122. The security device interface 122 is configured to couple the media device 106 with a security device 148 that is carried by the on-site auditor. A non-limiting example of the security device 148 is a key fob or other token-secured device that identifies itself to the media device 106 during an audit. For example, if the security device interface 122 includes a universal serial bus (USB) connection, then the security device interface 122 would be a USB port. In some embodiments, the security device 148 may emit a wireless signal, such as a radio frequency (RF) or infrared signal, that is receivable by the security device interface 122.

Alternatively, the wireless signal emitted by the security device 148 may be receivable by the remote interface 120. Thus, the security device interface 122 is not included in the media device 106. Here, the security device 148 may be a special purpose device, may be a duplicate of the remote control 136, or may be a universal type remote control.

As another example, the security device 148 may be implemented in a multi-purpose device such as a laptop computer, personal device assistant (PDA), cellular telephone, or the like. Such a multipurpose device may be physically coupled to the media device 106, such as by a USB cable or the like, or may be able to communicate with the media device 106 using a suitable wireless signal.

Embodiments of the service authorization system 100 provide a convenient and quick way for an on-site auditor to visually inspect the media device 106 to ensure that it is in compliance with services that the business operator has paid for. During an on-site audit, the auditor views the display 142. An audit trigger causes the processor system 110 to determine if the media device 106 is authorized for a particular service. In one embodiment, if the media device 106 is not authorized for the service, the processor system 110 generates the security watermark 102 from the watermark information, or access a security watermark 102 directly, and communicates the security watermark 102 to the media presentation device 104 for presentation of the security watermark 102 on the display 142. In another embodiment, if the media device 106 is not authorized for the service, the security watermark 102 is not generated and communicated to the media presentation device 104. Accordingly, the presence, or absence, of the security watermark 102 on the display 142 indicates to the on-site auditor that the media device 106 is authorized, or not authorized, to present a particular type of service.

For example, a premium service sporting event may require a special, one time payment by the business operator. Or, a particular premium service channel on which the premium service sporting event is provided may require a premium service charge for access to that premium service channel.

Once payment for the premium service is made, watermark information and/or the security watermark 102 is provided to the authorized media device(s) 106 at the business premises. Alternatively, the authorization can be communicated to and stored by the media device 106 such that the security watermark 102 can be retrieved from memory 112 or generated from the stored security watermark information 130.

When conducting an on-site audit, the media device 106 at the business premises is operated such that the service, such as the exemplary premium service sporting event, is presented on the display 142. In response to receiving an audit trigger, an exemplary embodiment generates and communicates the security watermark 102 to the media presentation device 104 so that the security watermark 102 becomes visible on the display 142. The displayed security watermark 102 indicates to the auditor that the business operator has paid for the premium service sporting event. However, if an unscrupulous business operator has somehow circumvented traditional security measures and has accessed the premium service sporting event in an unauthorized manner, the absence of the security watermark 102 indicates to the auditor that the business operator is not authorized to receive the premium service sporting event. Appropriate remedial measures can then be initiated by the service provider.

In an alternative embodiment, an audit trigger causes presentation of the security watermark 102 on any displays 142 receiving the authorized service. For example, the audit trigger could be periodically communicated to the media device 106. In response to receiving the periodic audit trigger, the security watermark 102 would be briefly displayed for a few seconds to indicate that the service was authorized. The brief periodic display of the security watermark 102 would not significantly interfere with the viewing and/or use of the service. However, if the service was not authorized, the security watermark 102 would not be presented on the displays 142. Absence of the periodically displayed security watermark 102 indicates to the auditor that the business operator is not authorized to receive the service.

In another exemplary auditing scenario, the presence of a displayed security watermark 102 indicates that the service has been accessed in an unauthorized manner. Here, the security watermark 102 is continuously or periodically displayed. Once payment for the service is made, the security watermark 102 is no longer displayed. For example, if an unscrupulous business operator has somehow circumvented traditional security measures and has accessed the premium service sporting event in an unauthorized manner, the presence of the security watermark 102 indicates to the auditor that the business operator is not authorized to receive the premium service.

In another exemplary auditing scenario, an absence of the displayed security watermark 102 indicates unauthorized access to the service. For example, if the unscrupulous business operator installs their residential account media device 106 at their business premises, which has not been authorized to receive the service, the customers are able to view the service using the residential account media device 106. However, since the residential account media device 106 is not configured to cause the display of the security watermark 102, the absence of the security watermark 102 will indicate to the auditor that the service is not authorized.

As another non-limiting example, an unscrupulous hotel operator may contract for ten media devices 106 that are authorized to receive premium movie channels. During an on-site audit, the auditor can visually check televisions in each hotel room. The authorized media devices 106 would, in response to receiving an audit trigger, cause the hotel televisions to present the security watermark 102 thereon. If the auditor found a hotel television that did not display the security watermark 102, the auditor would know that the unscrupulous hotel operator was obtaining premium movie services in some unauthorized manner.

In another example, the media device 106 may be a high capacity device that is capable of sourcing a plurality of media presentation devices 104. Here, the unscrupulous hotel operator, who contracted for sourcing ten televisions with a premium movie service, may have coupled more than ten televisions to the media device 106. If there were more than ten hotel televisions which displayed the security watermark 102, the auditor would know that the unscrupulous hotel operator was obtaining premium movie services in some unauthorized manner.

A security watermark 102 may be presented on the display 142 in any suitable manner. For example, the security watermark 102 may be relatively small, may have some degree of transparency, and/or may be presented in a corner of the display 142, such that the displayed security watermark 102 does not substantially interfere with program presentation. On the other hand, the security watermark 102 may be relatively large and opaque, and/or may be presented in a center of the display 142, such that the displayed security watermark 102 substantially interferes with program presentation.

In some embodiments, the security watermark 102 may be periodically displayed for a brief period. For example, the security watermark 102 may be displayed every five minutes, or after a commercial break, for a few seconds. The brief periodic display of the security watermark 102 would not significantly interfere with the viewing and/or use of the service.

The displayed security watermark 102 may include alphanumeric text. For example, the displayed security watermark 102 may provide a textual warning notice or the like. Some displayed security watermarks 102 include an icon or logo. For example, a logo or icon in the displayed security watermark 102 may not have any particular meaning to a casual viewer, but may have meaning to the on-site auditor who is covertly conducting an audit.

Some security watermarks 102 may present information pertaining to the service that the security watermark 102 is related to. For example, the security watermark 102 may include a logo or icon identifying a particular channel or program.

Security watermarks 102 may be used for marketing purposes associated with the service. Accordingly, security watermark 102 may be provided as a premium fee service. For example, if a premium service sporting event is being presented, the logo of a beverage company or an image of the beverage itself may be used as the security watermark 102. Alternatively, or additionally, the security watermark 102 may include text that is used to market a particular product and/or service. The security watermark 102 may be related to the business that has paid for the premium service corresponding to the watermark. For example, a bar may be providing the premium service sporting event to their customers. The bar may wish to have their business logo or other advertisement presented on the televisions in the bar. It is appreciated that marketing opportunities for the security watermark 102 are nearly limitless.

Displayed security watermarks 102 may include security information to aid the on-site auditor. For example, the displayed security watermark 102 may include an identifier of the authorized media device 106 that the media presentation device 104 is presumably coupled to. The security watermark 102 may include information identifying a particular station, a program title, and/or other information that identifies authorized premium services, such as a premium program channel and/or a premium program event. Accordingly, during an on-site audit, the security watermark 102 may indicate to the auditor which premium services that the media device 106 is authorized to provide.

In some embodiments, the security watermark 102 is displayed only on the premium service channel and/or premium service program that is associated with the security watermark 102. Alternatively, the security watermark 102 may be displayed on the display 142 regardless of the actual channel that the media device 106 is providing to the media presentation device 104. Additionally, or alternatively, a separate channel or display screen may be provided for the presentation of one or more security watermarks 102. For example, the auditor may change the channel to an audit channel, or change the screen to display an audit screen, wherein one or more security watermarks 102 may be displayed for auditing purposes. Here, authorization for several services can be concurrently audited.

Information to generate the security watermark 102 displayed on the display 142 may exist in various forms. For example, watermark information may include pertinent textual information and/or image information for a logo or icon. Alternatively, or additionally, watermarks may be stored graphically as images or icons, such as a Moving Picture Experts Group (MPEG) image, a Joint Photographic Experts Group (JPEG) image, or other visual media format image. The stored watermarks and/or watermark information is used by the authorization logic 128 to construct the security watermark 102.

In some embodiments, the watermarks and/or watermark information is stored into the security watermark 130 portion of memory 112. In alternative embodiments, the watermarks and/or watermark information may be stored on a different memory media, such as a volatile memory or the like (not shown).

In some embodiments, the watermarks and/or watermark information may be received and then used to construct the security watermark 102. Thus, the watermarks and/or watermark information need not be stored in the security watermark information 130 portion of memory 112.

Embodiments of the service authorization system 100 may receive watermarks and/or watermark information in one or more of a variety of manners. Watermarks and/or watermark information may be embedded into a program stream that corresponds to the premium program service. For example, watermarks and/or watermark information for a premium service channel, such as a movie channel or sports channel, may be embedded in with programming for that channel.

Alternatively, or additionally, the watermarks and/or watermark information could be communicated in a data stream. The watermarks and/or watermark information could be periodically communicated to the media device 106, or may be communicated at a suitable point in the programming, such as at the start of a particular premium service program or in advance of the scheduled start time of the premium service program. Alternatively, or additionally, the watermarks and/or watermark information could be communicated in a data channel, such as an electronic program guide channel or a dedicated watermark channel. Further, the watermark and/or watermark information may be updated to indicate that the displayed security watermark 102 is current and/or valid.

The watermarks and/or watermark information could be communicated separately to the media device 106. For example, if the media device 106 has a backchannel established to the remote audit system 144, via the communication network 146, the watermarks and/or watermark information could be provided as needed to support on-site audits.

The watermarks and/or watermark information could reside in the security device 148 and be communicated to the media device 106 during an on-site audit. In embodiments where the security device 148 is a key fob or other token-secured device that identifies itself to the media device 106 during an audit, the watermarks and/or watermark information may be stored in a memory of the security device 148. When the security device 148 is coupled to the media device 106, the watermarks and/or watermark information is communicated from the security device 148 to the media device 106. As another non-limiting example, if the security device 148 is a laptop or cell phone, the watermarks and/or watermark information could be communicated over the communication network 146 after a communication link to the media device 106 has been established.

Additionally, or alternatively, watermarks and/or watermark information may be initially set up on the media device 106 prior to or during delivery to the business. For example, watermarks and/or watermark information could be downloaded into the media device 106 at the manufacturing center or the distribution center. The watermarks and/or watermark information would be downloaded into the media device 106 as part of the installation process of the media device 106 at the business premises.

Alternatively, or additionally, the watermark and/or watermark information may be periodically communicated in the program content stream 132. The auditor initiates the audit trigger during their on-site audit. Accordingly, when the periodically communicated watermark and/or watermark information is received at the media device 106, the security watermark 102 is generated and presented on the display 142.

Audit triggers cause the media device 106 to generate and/or communicate the security watermark 102 to the media presentation device 104 such that the security watermark 102 is presented on the display 142. Audit triggers may be initiated and communicated in a variety of manners.

In some embodiments, audit triggers are remotely communicated to the media device 106 from the remote audit system 144. For example, but not limited to, the audit trigger may be communicated from the remote audit system 144 at a predetermined time that the auditor is scheduled to be at the business premises to perform an audit or other service. The auditor would simply view the premium service channel, or the channel that is providing the premium service event. If the security watermark 102 was displayed (or not displayed, depending upon the auditing scenario), the auditor would be able to determine that the media device 106 was authorized for the premium program service.

In some embodiments, the media device 106 has a unique identifier. Thus, the media device 106 is remotely addressable. An audit trigger may be communicated in the program content stream or a data stream with the identifier of the media device 106. When the media device 106 receives an audit trigger that is associated with its identifier, a security watermark 102 is generated and then communicated to the media presentation device 104 for presentation on the display 142.

In some embodiments, a globally transmitted trigger may be embedded in the program content stream 132 and/or the data stream at a selected time, such as during a key scene in the premium service program. Authorized media devices 106 would not display the security watermark 102 since the authorization logic 128 would not generate the security watermark 102 (in view that these media devices 106 are authorized to receive the premium service program). However, unauthorized media devices 106 that are providing the premium service program to a media presentation device 104 would have the security watermark 102 displayed. In some applications, the security watermark 102 may be a particularly visible icon, logo, and/or message that is displayed on the display 142 so as to interrupt viewing of the unauthorized premium service program.

Auditing triggers may be initiated by the auditor while at the business premises. For example, the security device 148 may initiate the audit trigger upon coupling to the media device 106, such as when the security device 148 is a USB type key fob.

In some embodiments the security device 148 is configured to communicate with the media device 106 using a wireless signal. Here, the auditor may actuate a button or the like on their security device 148 that transmits a wireless audit trigger signal to the media device 106.

Alternatively, or additionally, the remote control 136 may be used to initiate the wireless audit trigger. For example, a security code would be entered using the actuators 138 on the remote control 136. Entry of a valid security code would then cause the remote control 136 to transmit a wireless audit trigger signal to the media device 106.

Alternatively, or additionally, the auditor may use their cell phone or other device to establish a communication link with the media device 106 (in embodiments where the security device interface 122 is configured to receive wireless telephone calls or where the security device interface 122 is a modem or the like that is configured to receive telephone calls). In some embodiments, the auditor uses their cell phone or other device to link to the remote audit system 144. The auditor may use their cell phone key pad to enter codes that initiate communication of an audit trigger to the media device 106.

Alternatively, or additionally, the auditor may use their laptop computer or other device to establish a communication link with the media device 106, either directly using the security device interface 122 and/or via the communication network 146. Thus, relatively complex auditing tasks, including the display of the security watermark 102, may be performed by the auditor.

Alternatively, or additionally, one or more actuators 138 residing on the media device 106 may be used to initiate the audit trigger. For example, a security code would be entered using the actuators 138 on the media device 106. Entry of a valid security code would then cause the media device 106 to generate the security watermark 102.

In some embodiments, a plurality of different security codes are entered, via the actuators 138, to generate a plurality of different audit triggers. The different audit triggers would test for different types of authorized use (or unauthorized use) of premium program services. Further, the displayed security watermarks 102 could be different from each other so as to visually indicate to the auditor information regarding the audit.

In another auditing scenario, an auditor may remotely conduct a "virtual" on-site audit where information is remotely received by the auditor. For example, if programming is supplied via the Internet by a business, the auditor can access the business' Internet site and remotely access the provided programming to determine if the business is authorized to provide the programming from their Internet site. Here, the media device 106 is a personal computer or the like, and the program content stream 132 corresponds to program content received over the Internet from the Internet site. The auditor conducting a virtual on-site audit could then view security watermarks 102 on the display 142 coupled to, or integrated into, their computer.

It should be emphasized that the above-described embodiments of the service authorization system 100 are merely possible examples of implementations of the invention. Many variations and modifications may be made to the above-described embodiments. All such modifications and variations are intended to be included herein within the scope of this disclosure and protected by the following claims.

The embodiments of the invention in which an exclusive property or privilege is claimed are defined as follows:

1. A method to detect access authorization for a service during an audit, the method comprising:
   receiving an audit trigger at a media device that is operable to communicate the service to a media presentation device;
   determining, with a processor system of the media device and in response to receiving the audit trigger, whether the media device is authorized to communicate the service to the media presentation device;
   generating a security watermark in response to determining that the media device is not authorized to communicate the service to the media presentation device; and
   communicating the security watermark from the media device to the media presentation device,
   wherein the security watermark is displayed on a display of the media presentation device, and
   wherein the security watermark indicates to an auditor performing the audit that the media device is not authorized to communicate the service to the media presentation device.

2. A method to detect access authorization for a service during an audit, the method comprising:
   receiving an audit trigger at a media device that is operable to communicate the service to a media presentation device;
   determining, with a processor system of the media device and in response to receiving the audit trigger, whether the media device is authorized to communicate the service to the media presentation device;
   generating a security watermark in response to determining that the media device is authorized to communicate the service to the media presentation device; and
   communicating the security watermark from the media device to the media presentation device,
   wherein the security watermark is displayed on a display of the media presentation device, and
   wherein the security watermark indicates to an auditor performing the audit that the media device is authorized to communicate the service to the media presentation device.

3. The method of claim 1, further comprising:
receiving an authorization to access the service at the media device prior to receiving the audit trigger.

4. The method of claim 1, further comprising:
receiving the audit trigger in at least one of a program stream and a data stream that is received by the media device.

5. The method of claim 1, further comprising:
periodically receiving security watermark information in at least one of a program stream and a data stream.

6. The method of claim 5, further comprising:
storing the security watermark information in a memory of the media device;
retrieving the security watermark information from the memory in response to receiving the audit trigger; and
generating the security watermark from the security watermark information.

7. The method of claim 5, further comprising:
determining whether the audit trigger has been received; and
generating the security watermark from the security watermark information in response to determining that the audit trigger has been received,
wherein the security watermark is communicated from the media device to the media presentation device in response to receiving both the security watermark and the audit trigger.

8. The method of claim 1, further comprising:
receiving the audit trigger from a security device operated by the auditor performing the audit.

9. The method of claim 8, further comprising:
receiving the security watermark at the media device from the security device.

10. The method of claim 8, wherein the security device is a remote control that controls operation of at least the media device, wherein the auditor performing the audit enters an access code into the remote control to cause the remote control to communicate a wireless audit trigger signal that includes the audit trigger, and further comprising:
receiving the wireless audit trigger signal from the remote control.

11. The method of claim 8, wherein the security device is a key fob or token-secured device that is physically coupled to the media device by the auditor performing the audit, and further comprising:
communicating the audit trigger from the key fob or token-secured device to the media device.

12. The method of claim 8, wherein the media device includes at least one controller that controls operation of the media device, and wherein receiving the audit trigger comprises:
receiving a signal from the at least one controller in response to actuation of the at least one controller by the auditor performing the audit, wherein the signal corresponds to the audit trigger.

13. The method of claim 8, wherein the security device is a cellular phone, and further comprising:
receiving a call at the media device from the cellular phone, wherein the call includes the audit trigger.

14. A media device that audits authorization to access a service, comprising:
a program content stream interface configured to receive the service;
a presentation device interface configured to communicate the service to a media presentation device;
an interface configured to receive an audit trigger; and
a processor system communicatively coupled to the program content stream interface, the audit trigger interface, and the media presentation device, wherein the processor system is configured to:
determine, in response to receiving the audit trigger, whether the media device is authorized to communicate the service to the media presentation device, and
generate, in response to determining the authorization, a security watermark that is communicated from the presentation device interface to the media presentation device based upon the determined authorization of the media device,
wherein the security watermark is displayed on a display of the media presentation device, and
wherein the security watermark indicates authorization of the media device to access the service to an auditor performing an audit.

15. The media device of claim 14, wherein the interface is a remote interface configured to receive a wireless audit trigger generated by a remote control based upon a security code entered into the remote control by the auditor performing the audit.

16. The media device of claim 14, wherein the interface is a network interface configured to receive the audit trigger via a communication network, and wherein the audit trigger is generated by a security device in communication with the network interface via the communication network.

17. The media device of claim 14, further comprising:
a memory communicatively coupled to the processor system, wherein watermark information is stored in the memory, wherein the watermark information is retrieved from the memory by the processor system to generate the security watermark, and wherein the watermark is received in a program content stream.

18. An auditing system for auditing an authorization to access a service, comprising:
a security device configured to generate an audit trigger; and
a media device configured to receive a premium service in a program content stream,
wherein the media device determines if it is authorized to communicate the premium service to a media presentation device in response to receiving the audit trigger from the security device, and wherein the media device generates and communicates a security watermark to the media presentation device for display in response to the determined authorization, and wherein the security watermark indicates authorization of the media device to access the premium service to an auditor performing an audit.

19. The auditing system of claim 18, wherein the security device comprises at least one selected from a group consisting of a token-secured device, a cellular phone, a laptop, a remote control, and a wireless transmitter,
wherein the token-secured device is physically coupled to the media device by the auditor performing the audit, and wherein the audit trigger is communicated from the token-secured device to the media device,
wherein the cellular phone places a call the media device, and wherein the call includes the audit trigger,
wherein the laptop establishes a communication link to the media device via a communication network, and wherein the laptop communicates the audit trigger to the media device via the communication system, and
wherein the remote control generates a wireless signal that is received by the media device, and wherein the wireless signal includes the audit trigger.

20. The method of claim 2, further comprising:
receiving the audit trigger in at least one of a program stream and a data stream that is received by the media device.

21. The method of claim 2, further comprising:
receiving the audit trigger from a security device operated by the auditor performing the audit.

\* \* \* \* \*